May 16, 1950 H. HURVITZ 2,507,525

PANORAMIC SYSTEM

Filed Feb. 6, 1948

INVENTOR.

Hyman Hurvitz

Patented May 16, 1950 2,507,525

UNITED STATES PATENT OFFICE 2,507,525

PANORAMIC SYSTEM

Hyman Hurvitz, Washington, D. C., assignor of one-half to Marcel Wallace, doing business as Panoramic Laboratories, East Portchester, Conn., and one-half to Panoramic Radio Corporation, New York, N. Y., a corporation Application February 6, 1948, Serial No. 6,624

11 Claims. (Cl. 250—20)

This invention relates generally to panoramic systems for detecting and displaying a frequency spectrum, by a process of progressive analysis of the frequency content of said spectrum.

It is well known in the prior art to analyze a band of frequencies by applying the latter to a wide band mixer, to which is applied in heterodyning relation, the output of a frequency modulated local oscillator, the mixer operating into a narrow band I. F. amplifier, which acts as a narrow frequency gate. As the frequency of the local oscillator varies successively different portions of the spectrum are translated into the I. F. amplifier, and the output of the latter is detected and applied to the vertical deflection electrodes of a cathode ray tube indicator, the horizontal deflection electrodes having applied thereto a voltage proportional to the frequency excursions, or scan, of the frequency modulated oscillator, whereby to provide a frequency axis on the face of the indicator.

It will be realized that for extremely low rates of scanning the resolution possible with systems of the above character depends upon the band width of the intermediate frequency amplifier, or frequency gate. If the gate is sufficiently wide, signals at two adjacent frequencies will enter simultaneously and will provide a joint or undifferentiable response. Hence, to obtain good resolution between adjacent frequencies a relatively narrow I. F. band width is required. However, it may be desirable to sweep at a relatively rapid rate, and it is found, as the rate of sweep increases, that the I. F. amplifier fails to respond to the full amplitude of signals as they are heterodyned into the amplifier, and that the I. F. amplifier continues to respond for an appreciable time after the signals have been removed. The transient response of the amplifier is then not sufficiently rapid to follow the rapid build up and decay of the impressed signal, and the response in the indicator broadens so that resolution is lost.

If resolution S of a panoramic system be defined as the displayed width in terms of frequency of a single frequency signal at points 3 db. down on the display, it is found that $$S=\sqrt{\frac{2dF}{dt}}$$

where $$\frac{dF}{dt}$$

equals rate of frequency scanning in cycles per second, and that to obtain optimum S in a given system, for a given rate of sweep $$\frac{dF}{dt}$$

the I. F. band width must equal $$f=\sqrt{\frac{1}{2}\frac{dF}{dt}}$$

If then the desired resolution is determined for any value of I. F. band width a definite value of $$\frac{dF}{dt}$$

is established, and the better resolutions apparently attainable by utilizing narrow band I. F. amplifiers may actually be obtained only at the cost of decreased sweep rates.

It is, accordingly, usual in designing panoramic systems to select an I. F. band width and a sweep rate, which together are adapted to provide a desired resolution. Where the spectrum to be analyzed is great and considerable resolution is required, the design limitations above discussed lead to a very slow repetition rate for repetitive scanning, in order to keep the scanning rate, $$\frac{dF}{dt}$$

low. This is, for many purposes undesirable, and particularly in applications where it is desired to monitor a band of frequencies within which signal may be expected to occur infrequently, since in such case the signals may occur at one frequency while scanning is taking place at another, and interception of signals thereby become unlikely.

Upon considering the problem of signal interception by means of panoramic systems it will be evident that the rate of scanning is immaterial except in the presence of signals, and need only be sufficiently slow to enable optimum resolution while a signal is being received, the rate of sweep at other times being immaterial. This consideration is the basis of the present invention, wherein scanning is conducted at a rate above optimum until a signal is found. At this instant the scanning rate $$\frac{dF}{dt}$$

is decreased to a rate adequate to enable optimum response of the system. Upon passing the signal the fast rate of sweep is resumed. The system also finds uses in analyzing discontinuous Fourier type spectra, the sweep rate being decreased at each discrete frequency component and increased therebetween.

It is, accordingly, an object of the invention to provide a panoramic system of spectrum analysis wherein the frequency scanning rate is adjusted to an optimum value only in response to the presence of signals.

It is, more broadly stated, an object of the present invention to provide a panoramic system of spectrum analysis having no limitations in respect to average rate of frequency scanning.

It is, otherwise stated, an object of the present invention to provide a frequency scanning panoramic system of spectrum analysis, wherein the nominal rate of sweep may be unrelated to the bandwidth of the frequency gate utilized, without sacrifice of resolution.

It is a further and more specific object of the invention to provide a system of frequency scanning panoramic spectrum analysis wherein the instantaneous rate of frequency scanning is determined by the presence or absence of signal at each instant.

The above and still further objects and advantages of the present system will become apparent upon consideration of the following detailed description of a specific embodiment thereof, especially when taken in conjunction with the accompanying drawings, wherein.

Figures 1, 2, 3:
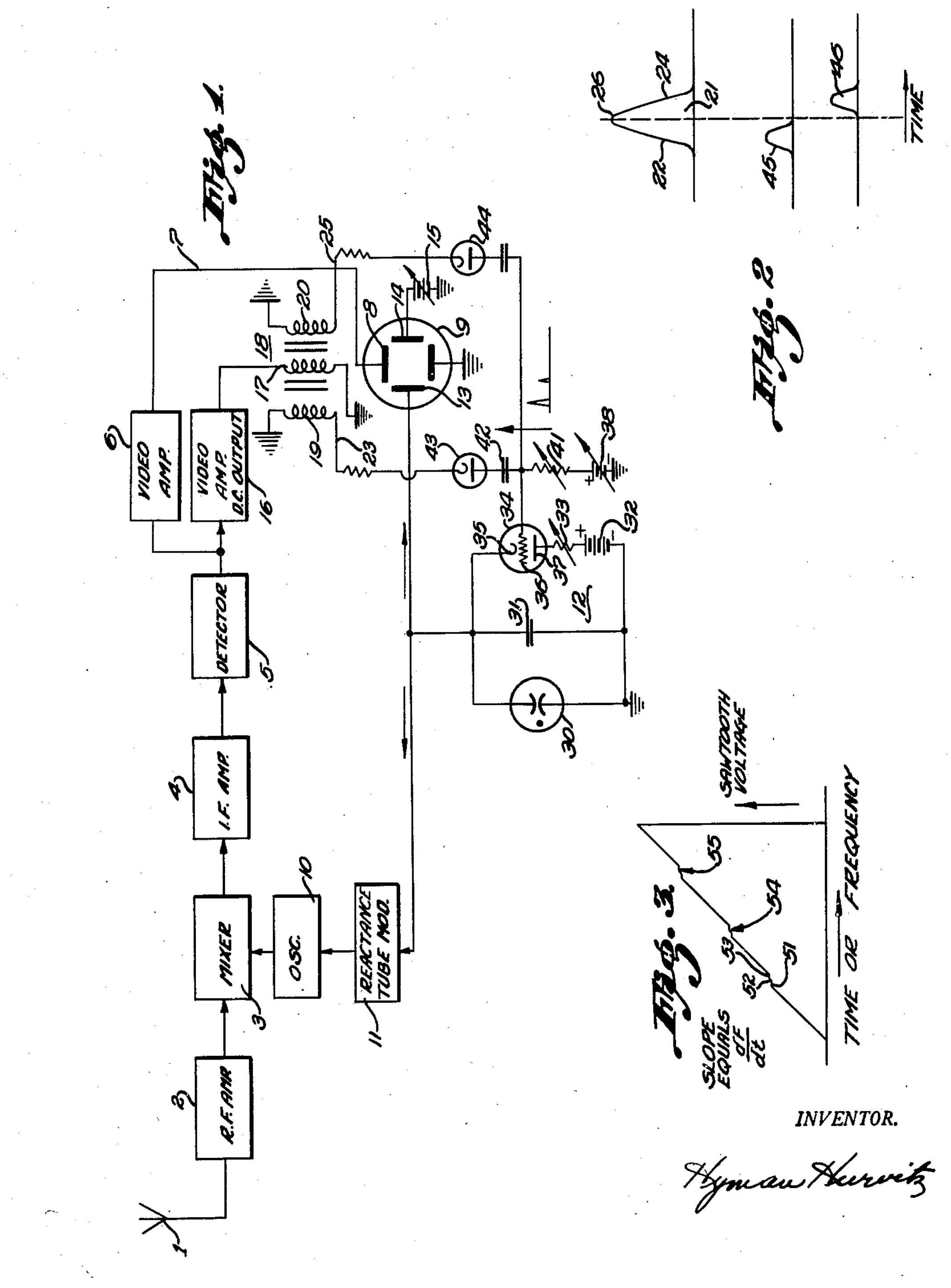
Figure 1 is a circuit diagram, partially in block form, of an embodiment of the invention.
Figure 2 is a wave form diagram, useful in explaining the operation of the system of Figure 1.
Figure 3 is a further wave form diagram useful in explaining the operation of the system of Figure 1.

Referring now more specifically to the drawings, the reference numeral 1 denotes a receiving antenna which may be coupled to a wide band R. F. amplifier 2, which applies a spectrum to be analyzed to the input of a mixer 3. The mixer feeds into a narrow band I. F. amplifier 4, the output of which may be detected in a detector 5 and amplified in a video amplifier 6, the output of the amplifier 6 being applied over a lead 7 to a vertical deflecting electrode 8 of a cathode ray tube indicator 9.

The mixer 3 may be supplied with heterodyning signal by an oscillator 10, which may be frequency modulated by a reactance tube modulator 11, and the latter may be supplied with frequency control signal by a saw-tooth generator, generally identified by the numeral 12. The output of the generator 12 may likewise be applied to one of the horizontal deflection electrodes 13, of the indicator tube 9, to provide a frequency axis across the face thereof. The other horizontal deflection electrode 14 may be supplied with bias voltage from a variable voltage source 15, to enable any desired lateral shift of the beam of the oscilloscope, or of an entire trace produced thereby.

The system as so far described in detail is conventional. My improvement relates to the method of controlling the instantaneous rate of sweep of the oscillator 12 in response to received signals. Control signal is derived from an auxiliary video amplifier 16, the output of which is applied to ground over the primary 17 of a transformer 18, having two secondaries, 19 and 20, which are effectively wound in what may be called push-push relation with respect to the primary 17. More specifically, while signal is increasing in primary 17, for example while the system is following a typical panoramic response curve 21 (Figure 2) over its ascending slope 22, the voltage induced in coil 19 may be such that the lead 23 receives negative potential, the voltage induced in secondary 20 being of opposite polarity. On decrease of signal, as at 24, the lead 23 may be made more positive than ground, secondary 20 again having induced therein potential of opposite polarity. Accordingly, in response to a signal 21, the lead 23 goes negative while the signal is increasing, and thereafter the lead 25 goes negative while the signal is decreasing. The intensity of the negative potential is proportional to the instantaneous rate of increase or of decrease of the signal 21, no signal being provided at the maximum 26 of the signal 21. In the complete absence of signal the leads 23 and 25 remain at ground potential.

The saw-tooth generator 12 comprises a gaseous tube 30, which contains two electrodes, and which passes current when and only when the potentials applied to the electrodes exceeds a predetermined value. When the applied potential is less than this value the tube is non-conductive.

In parallel with the tube 30 is connected a condenser 31, and in parallel with the condenser 31 is connected, in series, a potential source 32, a variable control resistance 33 and a control triode 34, the latter having a cathode 35, a control grid 36 and an anode 37.

The source 32 is properly poled to charge the condenser 31, the charging current flowing through the control resistor 33 and the control triode 34, which thus may together serve to determine the charging rate of the condenser 31. The grid 36 of the triode 34 may be normally biased by means of a voltage source 38 to a relatively high positive value, so that the triode 34 presents a small internal resistance to the source 32. The charging time of the condenser 31 is then determined largely by the value of variable resistance 33.

In normal operation then, i. e. in the absence of signals at the output of video amplifier 16, the condenser 31 charges at a rate determined by the value of the adjustable resistance 33, and by its own capacitance, until it attains a voltage sufficient to fire the tube 30. Thereupon, an instantaneous discharge of the condenser 31 takes place, the potential across tube 30 drops to zero, the tube deionizes and the recharging cycle re-commences. The output of the generator 12 is accordingly substantially of saw-tooth form and the repetition rate or frequency of the generator 12 is substantially constant.

Now assume interception of a signal by the system, with the consequent production of a pulse, as 21, in the primary 17 of transformer 18.

On the rise 22 of the pulse lead 23 becomes negative and lead 25 positive. When lead 23 becomes negative current flows from source 40, over variable resistance 41, condenser 42, diode 43, and secondary winding 19, the diode 43 being properly poled for this purpose. At the same time, diode 44 prevents current flow in response to the positive potential on the cathode thereof, deriving from secondary 20. The flow of current in resistance 41 causes a decrease in the positive bias on grid 36, and a consequent increase in the internal resistance of triode 34. This in turn decreases the charging rate of condenser 31, and hence the slope of the saw-tooth output of the generator 12, or the sweep rate $$\frac{dF}{dt}$$

The decrease in sweep rate increases the response of the I. F. amplifier, which increases the slope of the output, and which in turn reacts on the potential of the grid 36 to further block triode 34, and further decrease the sweep rate. The action is accordingly cumulative, and the sweep rate is rapidly decreased, until further decrease no longer serves to increase response. This is approximately the optimum rate for the equipment.

As the signal passes over the peak 26 control voltage output from transformer 18 momentarily ceases, and then as the signal drops in amplitude, picks up again, but now with the lead 25 negative and the lead 23 positive. Accordingly, current flows up through resistance 41, but now via diode 44, rather than via diode 43, the latter now blocking due to the increased positive potential on its cathode. Again the sweep rate decreases, permitting the signal to drop at substantially an optimum rate. The changes in resistance which take place in triode 34, in response to a signal 21, may be represented then, by curves 45 and 46, plotted against a time axis.

Adjustment of resistance 41 serves to determine the changes in potential at grid 36, in response to given signals and adjustment may be accomplished by trial until optimum results are accomplished.

Referring now to Figure 3 of the drawings, there is represented the character of the saw-tooth output of the generator 12, three separate signals being encountered by the receiver during a complete voltage cycle of the generator 12, which corresponds with one complete scan of the frequency spectrum subject to analysis.

This saw-tooth voltage commences at a first rate $$\frac{dF}{dt}$$

determined primarily by the bias provided by source 38, and by the value of the variable resistance 33, as illustrated in Figure 3. At 51 a signal is found, and the sweep rate decreases radically in response to a control voltage, as 45 (Figure 2). As the frequency continues to sweep, now slowly, the peak of the I. F. response curve 26 is passed through, and signal responsive bias control voltage is lost. For an instant the sweep resumes its original rate, as at 52, but almost immediately, the signal passes down the ascending side of the response curve, 24, and control signal reappears, as at 46. Again the sweep rate $$\frac{dF}{dt}$$

decreases sharply, as at 53, until the signal is lost. Immediately the original sweep rate reasserts itself, and continues until a further signal is found, when the process represented by the plots identified by reference numerals 51, 52 and 53 repeats, at points 54 and 55 in the scanning curve.

What I claim and desire to secure by Letters Patent of the United States is:

1. A panoramic system comprising a source of signals occurring within a first predetermined frequency spectrum, a heterodyne mixer having an input circuit adapted to accept said first predetermined frequency spectrum, means for coupling said source of signals to the input circuit of said mixer, a heterodyne oscillator coupled to said mixer for converting the frequencies of signals applied to the input circuit of said mixer to further frequencies, a relatively narrow band amplifier coupled to the output circuit of said mixer, said amplifier being tuned to receive at least one of said further frequencies, means for varying the frequency of said heterodyne oscillator over a predetermined range of frequencies for heterodyning frequencies within said first predetermined frequency spectrum in succession to a frequency equal to the tuned frequency of said amplifier, said means for varying comprising a frequency modulator responsive to modulating voltage for varying the frequency of said heterodyne oscillator, a source of said modulating voltage having a predetermined rate of voltage variation with time, and means responsive to the presence of each signal in said amplifier for only transiently modifying said rate of variation with time.

2. A panoramic system in accordance with claim 1 wherein said last named means corresponds with means for decreasing the said rate of voltage variation with time.

3. The combination in accordance with claim 2 wherein said decrease in said rate of voltage variation with time is of such magnitude as substantially to optimize the response of said amplifier to said signals.

4. The combination in accordance with claim 1 wherein said source of modulating voltage includes an oscillator comprising a condenser, a source of charging potential for said condenser, and a variable impedance for determining the rate of charge of said condenser, and means responsive to received signals for controlling said variable impedance.

5. The combination in accordance with claim 4 wherein said source of modulating voltage includes a relaxation oscillator comprising a condenser, a source of charging potential for said condenser and a variable impedance for determining the rate of charge of said condenser, and means responsive to a time derivative of the envelope of signals in said amplifier for controlling said variable impedance.

6. The combination in accordance with claim 1 wherein said source of modulating voltage includes a saw-tooth oscillator, and means for controlling the instantaneous value of the rate of voltage variation with time of the saw-tooth output of said saw-tooth oscillator.

7. In a frequency scanning panoramic system having a display device for displaying the frequency values of signals existing in a predetermined frequency spectrum, means for periodically effecting frequency scans across said entire spectrum at a first predetermined rate of scan, and means for only transiently decreasing said rate of scan in response to each signal encountered duirng each of said scans periodically effected across said entire spectrum.

8. A panoramic system comprising a source of signals occurring at random throughout a predetermined spectrum, a scanning frequency gate for scanning successive portions of said predetermined spectrum in successive periods of time, and an indicator for indicating the constitution of said spectrum, said frequency gate having a predetermined pass band and said scanning occurring at a rate greater than the scanning rate required for the attainment of optimum resolution of frequencies in said predetermined spectrum, having regard for the width of said pass band, and means responsive to the presence of signals within said pass band for transiently increasing the resolution of said panoramic system during said presence.

9. A system in accordance with claim 8 wherein said last named means comprising means for decreasing the scanning rate of said scanning gate.

10. The combination in accordance with claim 8 wherein said last named means is responsive only to the presence of said signals and for the duration of said signals for increasing the resolution of said panoramic system.

11. In a frequency scanning panoramic system having a visual display device for displaying the frequency values of signals existing in a predetermined frequency spectrum, means for establishing a first frequency scan across said spectrum at a rate of scan in excess of that required to provide optimum displays of said signals on said display device, and means responsive to each signal encountered during each scan established by said first means, and operative substantially only during said each signal, for reducing said rate of scan.

HYMAN HURVITZ.

REFERENCES CITED

The following references are of record in the file of this patent:

UNITED STATES PATENTS

| Number | Name | Date |
|---|---|---|
| 2,287,925 | White | June 30, 1942 |
| 2,304,871 | Andrews | Dec. 15, 1942 |
| 2,312,203 | Wallace | Feb. 23, 1943 |
| 2,355,363 | Christaldi | Aug. 8, 1944 |
| 2,410,075 | Hutchins et al. | Oct. 29, 1946 |
| 2,476,897 | Myhre | July 19, 1949 |